United States Patent
Kikuchi et al.

(10) Patent No.: US 9,506,384 B2
(45) Date of Patent: Nov. 29, 2016

(54) PLUGGED HONEYCOMB STRUCTURE

(71) Applicant: NGK Insulators, Ltd., Nagoya (JP)

(72) Inventors: Yoshio Kikuchi, Nagoya (JP);
Takafumi Kimata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/621,586

(22) Filed: Feb. 13, 2015

(65) Prior Publication Data

US 2015/0260065 A1    Sep. 17, 2015

(30) Foreign Application Priority Data

Mar. 14, 2014 (JP) .................. 2014-052418

(51) Int. Cl.
*B01J 23/00* (2006.01)
*B01J 23/02* (2006.01)
(Continued)

(52) U.S. Cl.
CPC ......... *F01N 3/0222* (2013.01); *B01D 46/2418* (2013.01); *B01D 46/2429* (2013.01); *B01J 21/12* (2013.01); *B01J 35/04* (2013.01); *B32B 3/12* (2013.01); *C04B 35/117* (2013.01); *C04B 35/636* (2013.01); *C04B 35/638* (2013.01); *C04B 35/6365* (2013.01); *C04B 37/003* (2013.01); *C04B 38/0006* (2013.01); *F01N 3/2828* (2013.01); *B01D 2046/2433* (2013.01); *B01D 2046/2437* (2013.01); *B01J 21/16* (2013.01); *B01J 35/0026* (2013.01); *C04B 2111/0081* (2013.01); *C04B 2111/00793* (2013.01); *C04B 2201/30* (2013.01); *C04B 2235/3217* (2013.01);

(Continued)

(58) Field of Classification Search
CPC ........ B01J 21/04; B01J 21/063; B01J 21/10; B01J 21/12; B01J 21/14; B01J 23/35; B01J 23/04; B01J 23/10
USPC .............................. 502/263, 351, 439, 527.19
See application file for complete search history.

(56) References Cited

U.S. PATENT DOCUMENTS 4,749,671 A * 6/1988 Saito .................. B01D 39/2017
502/177
5,198,007 A * 3/1993 Moyer .................. B01D 29/31
210/510.1
(Continued)

FOREIGN PATENT DOCUMENTS

EP    2 133 522 A1    12/2009
EP    2 554 236 AL    2/2013
(Continued)

OTHER PUBLICATIONS

Extended European Search Report (Application No. 15 157950.5) dated Jun. 25, 2015.

*Primary Examiner* — Cam N. Nguyen
(74) *Attorney, Agent, or Firm* — Burr & Brown, PLLC

(57) ABSTRACT

There is disclosed a plugged honeycomb structure. A plugged honeycomb structure includes a pillar-shaped honeycomb structure body having porous partition walls defining a plurality of cells which become through channels for a fluid and extend from a first end face to a second end face, and plugging portions disposed in open ends of predetermined cells in the first end face and open ends of residual cells in the second end face, and the partition walls are constituted of a porous body including $\alpha$-$Al_2O_3$ as a main phase and further including aluminum titanate and glass.

17 Claims, 4 Drawing Sheets

(51) Int. Cl.

| | | |
|---|---|---|
| *B01J 21/00* | (2006.01) | |
| *B01J 21/04* | (2006.01) | |
| *F01N 3/022* | (2006.01) | |
| *B01J 35/04* | (2006.01) | |
| *C04B 35/117* | (2006.01) | |
| *C04B 35/636* | (2006.01) | |
| *C04B 35/638* | (2006.01) | |
| *C04B 37/00* | (2006.01) | |
| *C04B 38/00* | (2006.01) | |
| *B01J 21/12* | (2006.01) | |
| *B32B 3/12* | (2006.01) | |
| *F01N 3/28* | (2006.01) | |
| *C04B 111/00* | (2006.01) | |
| *B01D 46/24* | (2006.01) | |
| *B01J 21/16* | (2006.01) | |
| *B01J 35/00* | (2006.01) | |

(52) U.S. Cl.
CPC ............ *C04B 2235/3232* (2013.01); *C04B 2235/3234* (2013.01); *C04B 2235/349* (2013.01); *C04B 2235/3472* (2013.01); *C04B 2235/36* (2013.01); *C04B 2235/5436* (2013.01); *C04B 2235/5445* (2013.01); *C04B 2235/606* (2013.01); *C04B 2235/6021* (2013.01); *C04B 2235/77* (2013.01); *C04B 2235/80* (2013.01); *C04B 2235/9607* (2013.01); *C04B 2237/343* (2013.01); *Y10T 428/24157* (2015.01)

(56) References Cited

U.S. PATENT DOCUMENTS

| | | | | |
|---|---|---|---|---|
| 6,300,263 | B1 * | 10/2001 | Merkel | C03C 10/0045 264/631 |
| 6,541,407 | B2 * | 4/2003 | Beall | B01D 39/2068 264/631 |
| RE38,888 | E * | 11/2005 | Beall | B01D 39/2068 264/631 |
| 7,071,135 | B2 * | 7/2006 | Ogunwumi | C03C 3/083 264/630 |
| 7,504,359 | B2 * | 3/2009 | Ogyu | B01D 46/2429 423/345 |
| 7,510,755 | B2 * | 3/2009 | Masukawa | B01J 35/04 428/116 |
| 7,618,699 | B2 * | 11/2009 | Beall | C04B 35/195 264/631 |
| 7,718,143 | B2 * | 5/2010 | Ogura | B01D 53/944 422/180 |
| 7,732,366 | B2 * | 6/2010 | Ohno | B01J 35/04 422/168 |
| 7,927,682 | B2 * | 4/2011 | Beall | C04B 35/195 428/116 |
| 7,964,263 | B2 * | 6/2011 | Kodama | C04B 38/0019 428/116 |
| 8,029,591 | B2 * | 10/2011 | Ohno | B01D 39/2075 422/177 |
| 8,039,089 | B2 * | 10/2011 | Yoshida | B01D 39/2093 422/180 |
| 8,119,075 | B2 * | 2/2012 | Dettling | B01D 53/944 422/180 |
| 8,192,517 | B2 * | 6/2012 | Kunieda | B01J 35/04 55/523 |
| 8,283,282 | B2 * | 10/2012 | Noguchi | B01D 46/2429 428/116 |
| 8,357,333 | B2 * | 1/2013 | Kunieda | B01D 53/9418 422/177 |
| 8,470,430 | B2 * | 6/2013 | Hiramatsu | B01J 23/63 428/116 |
| 8,512,433 | B2 * | 8/2013 | Beall | F01N 13/0093 422/169 |
| 8,658,104 | B2 * | 2/2014 | Matsukawa | C04B 35/447 422/180 |
| 2005/0272602 | A1 * | 12/2005 | Ninomiya | B01D 39/2068 502/439 |
| 2008/0057268 | A1 | 3/2008 | Lu et al. | |
| 2008/0138569 | A1 | 6/2008 | Collier et al. | |
| 2009/0004431 | A1 * | 1/2009 | Ninomiya | B01D 39/2068 428/116 |
| 2009/0239031 | A1 | 9/2009 | Ichikawa et al. | |
| 2010/0135866 | A1 * | 6/2010 | Mizuno | B01D 46/2425 422/180 |
| 2010/0310819 | A1 | 12/2010 | Suwabe et al. | |
| 2012/0009092 | A1 * | 1/2012 | Mizutani | B01J 23/002 422/177 |
| 2012/0009093 | A1 * | 1/2012 | Mizutani | B01J 23/002 422/177 |
| 2012/0240538 | A1 * | 9/2012 | Isoda | B01D 46/2429 55/486 |
| 2012/0251402 | A1 * | 10/2012 | Goto | B01D 46/2474 422/180 |
| 2013/0214463 | A1 | 8/2013 | Suwabe et al. | |
| 2015/0260067 | A1 * | 9/2015 | Kikuchi | B01D 46/0001 422/177 |
| 2015/0266779 | A1 * | 9/2015 | Miyairi | B01D 39/2075 428/116 |
| 2015/0367334 | A1 * | 12/2015 | Sadaoka | B01J 37/0217 502/71 |

FOREIGN PATENT DOCUMENTS

| | | |
|---|---|---|
| JP | 2008-136981 A1 | 6/2008 |
| WO | 2009/063997 A1 | 5/2009 |

\* cited by examiner

PLUGGED HONEYCOMB STRUCTURE

The present application is an application based on JP-2014-52418 filed with Japan Patent Office on Mar. 14, 2014, the entire contents of which are incorporated herein by reference.

BACKGROUND OF THE INVENTION

Field of the Invention

The present invention relates to a plugged honeycomb structure, and more particularly, it relates to a plugged honeycomb structure which can inhibit a temperature rise during use at high temperatures and is excellent in thermal shock resistance.

Background Art

An exhaust gas discharged from an internal combustion engine such as a diesel engine, each type of combustion device or the like includes a large amount of particulate matter (hereinafter also referred to as "PM") mainly composed of soot. When this PM is discharged as it is into the air atmosphere, an environmental pollution is caused. Therefore, in an exhaust system for the exhaust gas, a particulate filter to trap the PM is mounted. An example of the particulate filter is a diesel particulate filter (DPF) for use in purification of the exhaust gas discharged from the diesel engine.

In such a DPF, there is used, for example, a honeycomb structure having porous partition walls defining a plurality of cells which become through channels for the exhaust gas. In this honeycomb structure, plugging portions to plug open ends of cells are disposed in the open ends of the predetermined cells in an end face on an outflow side of the fluid and the open ends of the residual cells in an end face on an inflow side of the fluid, and hence this honeycomb structure is utilized as a plugged honeycomb structure. Hereinafter, a particulate filter such as the DPF in which the plugged honeycomb structure is used will generically be referred to as "a honeycomb filter" sometimes.

As the honeycomb structure for use in the DPF or the like, for example, a ceramic honeycomb structure has been suggested in which partition walls are constituted of main crystals of aluminum titanate forming a solid solution with MgO and $SiO_2$ (e.g., see Patent Document 1). Furthermore, as the honeycomb structure, for example, another honeycomb structure has been suggested in which a heat capacity C represented by a product of specific heat c (kJ/kg·K) and a specific gravity $\rho$ (kg/m$^3$) is from 400.0 to 2000.0 (kJ/m$^3$·K) and a thermal conductivity $\kappa$ is from 1.0 to 30.0 (W/m·K) (e.g., see Patent Document 2).

In a honeycomb filter such as the DPF, a pressure loss gradually increases due to the PM deposited in the filter with an elapse of time, and hence the PM deposited in the honeycomb filter is periodically burnt and removed to regenerate the filter sometimes. For example, as a method of regenerating the DPF, a regenerating method is known in which a temperature of the exhaust gas discharged from the engine is raised to heat the DPF by use of the exhaust gas at the high temperature. An example of a method of raising the temperature of the exhaust gas is a method in which by post jetting to temporarily excessively jet a fuel in a latter half of an explosion stroke or in an exhaust stroke, the excessive fuel is burnt to raise the temperature of the exhaust gas.

[Patent Document 1] WO 2009/63997
[Patent Document 2] JP-A-2008-136981

SUMMARY OF THE INVENTION

In recent years, an improvement of a fuel efficiency of a car has been demanded from the viewpoints of global environment protection and resource saving. As to the abovementioned regeneration of the DPF by the post jetting, a fuel which is not concerned with an engine output is consumed during the regeneration of the DPF, and hence the more frequently the regeneration takes place, the worse the fuel efficiency of the car becomes. Therefore, for the purpose of improving the fuel efficiency of a diesel engine for the car, decrease of the number of times to regenerate the abovementioned DPF (i.e., a plugged honeycomb structure) is investigated. That is, the consumption of the fuel required for the regeneration is inhibited as much as the decrease of the number of the times to regenerate the DPF, so that the improvement of the fuel efficiency of the engine can be achieved.

However, when the number of the times to regenerate the DPF is decreased, an interval until the regeneration is performed (i.e., a regeneration period) lengthens, and hence during the regeneration, a larger amount of soot than before is deposited on the surfaces of partition walls. Furthermore, when the amount of the soot to be deposited on the surfaces of the partition walls increases, a temperature rise due to burning of the soot enlarges, so that thermal shock is noticeably generated in the DPF. In consequence, when the number of the times to regenerate the DPF is decreased, there is increasingly the possibility that the DPF is damaged due to the thermal shock.

To prevent the abovementioned damages due to the thermal shock accompanying the decrease of the number of the times to regenerate the DPF, there is contrived a method of heightening a heat capacity of the partition walls of the plugged honeycomb structure for use in the DPF. For example, to heighten the heat capacity of the partition walls, there is a method of lowering a porosity of the partition walls. However, when the porosity of the partition walls is lowered, another problem occurs that a pressure loss of the DPF disadvantageously increases.

As another method of heightening the heat capacity of the partition walls, a method is contrived in which a material having a higher heat capacity than a material for use in the partition walls of the conventional plugged honeycomb structure is used as a material constituting the partition walls. However, any heretofore known material disclosed as the material of the partition walls of the plugged honeycomb structure does not have such a sufficiently high heat capacity, and hence it is not possible to inhibit the damages due to the thermal shock accompanying the decrease of the number of the times to regenerate the DPF. In consequence, there is demanded a development of a plugged honeycomb structure constituted of a new material usable in partition walls of the plugged honeycomb structure and having a high heat capacity so that it is possible to effectively inhibit the damages due to the thermal shock accompanying the decrease of the number of times to regenerate the DPF.

The present invention has been developed in view of the abovementioned problems, and an object thereof is to provide a plugged honeycomb structure which can inhibit a temperature rise during use at high temperatures and is excellent in thermal shock resistance.

To achieve the abovementioned object, according to the present invention, there is provided a plugged honeycomb structure as follows.

According to a first aspect of the present invention, a plugged honeycomb structure including a pillar-shaped honeycomb structure body having porous partition walls defining a plurality of cells which become through channels for a fluid and extend from a first end face to a second end face is provided, and plugging portions disposed in open ends of the predetermined cells in the first end face and open ends of the residual cells in the second end face, wherein the partition walls are constituted of a porous body including $\alpha$-$Al_2O_3$ as a main phase and further including aluminum titanate and glass.

According to a second aspect of the present invention, the plugged honeycomb structure according to the above first aspect is provided, wherein a mass ratio between the $\alpha$-$Al_2O_3$ and the aluminum titanate in the porous body is from 60/40 to 90/10.

According to a third aspect of the present invention, the plugged honeycomb structure according to the above first or second aspects is provided, wherein in the porous body, at least one selected from a first group consisting of Fe, Mg and Si is solid-dissolved in the aluminum titanate.

According to a fourth aspect of the present invention, the plugged honeycomb structure according to the above third aspect is provided, wherein a mass ratio of each of $Fe_2O_3$, MgO and $SiO_2$ obtained by oxide conversion of Fe, Mg and Si among solid-solution components included into the aluminum titanate is from 0.1 to 10.0 mass % to a total of masses of $Al_2O_3$ and $TiO_2$ obtained by oxide conversion of Al and Ti included in the aluminum titanate and masses of the solid-solution components included into the aluminum titanate which are obtained by the oxide conversion.

According to a fifth aspect of the present invention, the plugged honeycomb structure according to any one of the above first to fourth aspects is provided, wherein the porous body includes 5 to 15 mass % of the glass to 100 mass % in total of the $\alpha$-$Al_2O_3$, the aluminum titanate and the glass.

According to a sixth aspect of the present invention, the plugged honeycomb structure according to any one of the above first to fifth aspects is provided, wherein the glass includes $SiO_2$ and $Al_2O_3$.

According to a seventh aspect of the present invention, the plugged honeycomb structure according to the above sixth aspect is provided, wherein the glass further includes an oxide made of at least one selected from a group consisting of an alkali metal, an alkali earth metal, Ti and Fe.

According to an eighth aspect of the present invention, the plugged honeycomb structure according to any one of the above first to seventh aspects is provided, wherein a true density of a material constituting the porous body is from 3.65 to 3.85 $g/cm^3$.

According to a ninth aspect of the present invention, the plugged honeycomb structure according to any one of the above first to eighth aspects is provided, wherein a heat capacity of the material constituting the porous body at 600° C. is from 4.25 to 4.50 $J/K/cm^3$.

According to a tenth aspect of the present invention, the plugged honeycomb structure according to any one of the above first to ninth aspects is provided, wherein an average thermal expansion coefficient of the porous body at 40 to 800° C. is from 2.5 to 6.0 ppm/K.

According to an eleventh aspect of the present invention, the plugged honeycomb structure according to any one of the above first to tenth aspects is provided, wherein the porous body satisfies a relation of the following equation (1):

$$C - 0.007 \times \alpha^2 \geq 4.20 \qquad (1),$$

in which C is a heat capacity ($J/K/cm^3$) of the material constituting the porous body at 600° C. and $\alpha$ is an average thermal expansion coefficient (ppm/K) of the porous body at 40 to 800° C.

According to a twelfth aspect of the present invention, the plugged honeycomb structure according to any one of the above first to eleventh aspects is provided, wherein a porosity of the porous body is from 20 to 50%.

According to a thirteenth aspect of the present invention, the plugged honeycomb structure according to any one of the above first to twelfth aspects is provided, wherein an average pore diameter of the porous body is from 5 to 20 μm.

According to a fourteenth aspect of the present invention, the plugged honeycomb structure according to any one of the above first to thirteenth aspects is provided, wherein the honeycomb structure body is a segmented structure which has a plurality of pillar-shaped honeycomb segments having the partition walls and in which the plurality of honeycomb segments are bonded in a state where the honeycomb segments are disposed adjacent to one another so that side surfaces of the honeycomb segments face one another.

According to a fifteenth aspect of the present invention, the plugged honeycomb structure according to any one of the above first to fourteenth aspects is provided, wherein an exhaust gas purifying catalyst is loaded onto at least one of each surface of the partition walls of the honeycomb structure body and each pore of the partition walls.

A plugged honeycomb structure of the present invention has partition walls constituted of a porous body including $\alpha$-$Al_2O_3$ as a main phase and further including aluminum titanate and glass. This porous body constituting the partition walls has a higher heat capacity per unit volume of a material constituting the porous body as compared with a partition wall material for use in a heretofore known plugged honeycomb structure. In the plugged honeycomb structure of the present invention, the heat capacity per unit volume of the material constituting the porous body is high, and hence it is possible to produce a remarkable effect that the plugged honeycomb structure can inhibit a temperature rise during use at high temperatures and is excellent in thermal shock resistance. Therefore, when the plugged honeycomb structure of the present invention is used as a DPF, a temperature rise during regeneration of the DPF can be inhibited and, for example, even when the number of times to regenerate the DPF is decreased, damages due to thermal shock are not easily generated.

DETAILED DESCRIPTION OF THE INVENTION

Figure 1:
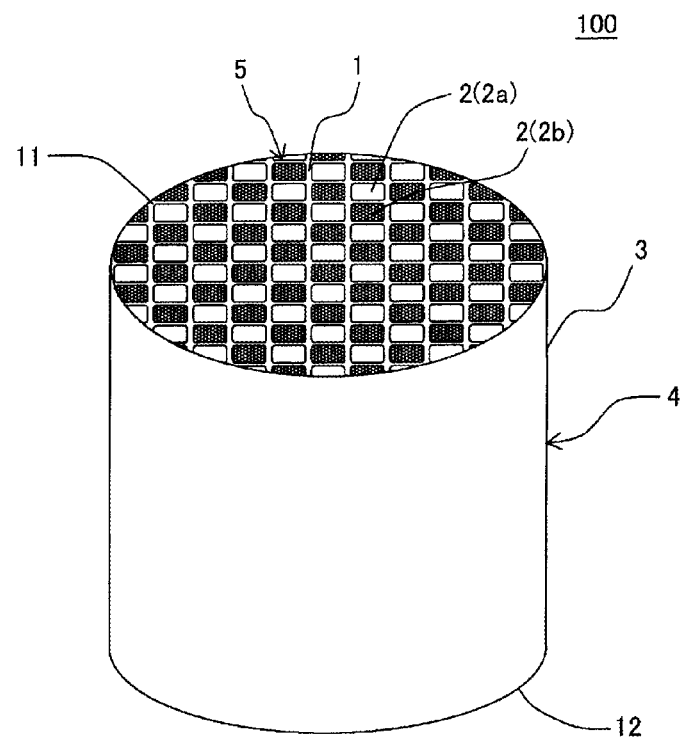
FIG. 1 is a schematic perspective view of one embodiment of a plugged honeycomb structure of the present invention seen from an inflow end face side.

Next, a mode for carrying out the present invention will be described in detail with reference to the drawings. It should be understood that the present invention is not limited to the following embodiments and that changes, improvements and the like of design are suitably added on the basis of ordinary knowledge of a person skilled in the art without departing from the gist of the present invention.

One embodiment of a plugged honeycomb structure of the present invention is a plugged honeycomb structure 100 including a pillar-shaped honeycomb structure body 4 and plugging portions 5 disposed in open ends of cells 2 as shown in FIG. 1 to FIG. 5. The honeycomb structure body 4 is a pillar-shaped body having porous partition walls 1 defining the plurality of cells 2 which become through channels for a fluid and extend from a first end face 11 to a second end face 12. The plugging portion 5 is disposed in one of the open ends of each of the plurality of cells 2 to plug the open end of the cell 2. In FIG. 1 to FIG. 5, the plugging portions 5 are disposed in the open ends of predetermined cells 2b (hereinafter referred to simply as "the cells 2b") in the first end face 11 and the open ends of the residual cells 2a (hereinafter referred to simply as "the cells 2a") in the second end face 12. The plugged honeycomb structure 100 having such a constitution is usable as a particulate filter to purify an exhaust gas discharged from an internal combustion engine or each type of combustion device. The plugged honeycomb structure 100 shown in FIG. 1 to FIG. 5 further has a circumferential wall 3 positioned at an outermost circumference of the honeycomb structure body 4.

Figure 2:
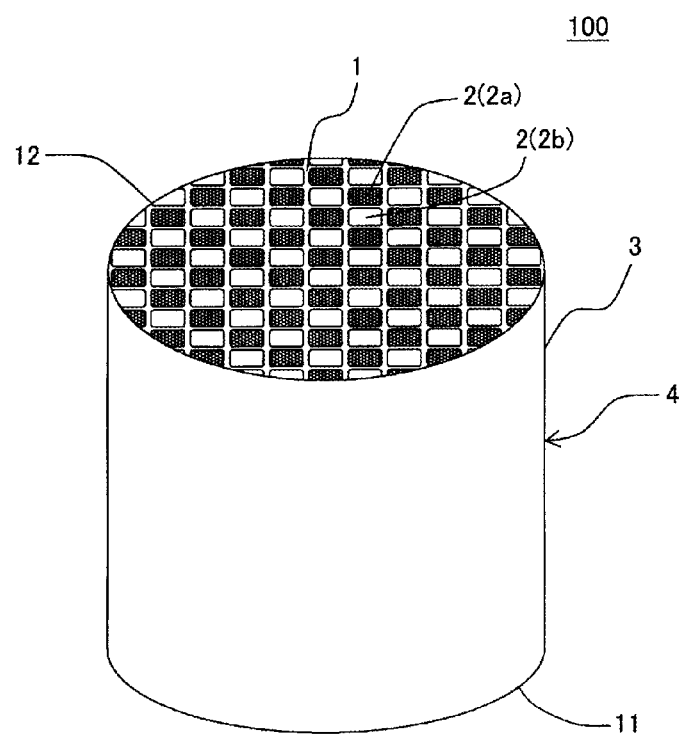
FIG. 2 is a schematic perspective view of the plugged honeycomb structure shown in FIG. 1 and seen from an outflow end face side.
Figure 3:
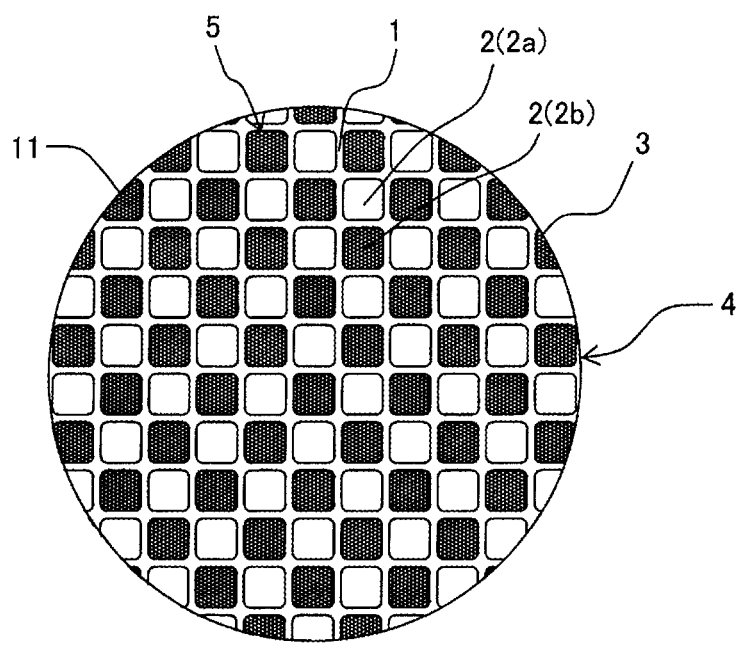
FIG. 3 is a schematic plan view of the plugged honeycomb structure shown in FIG. 1 and seen from the inflow end face side.
Figure 4:
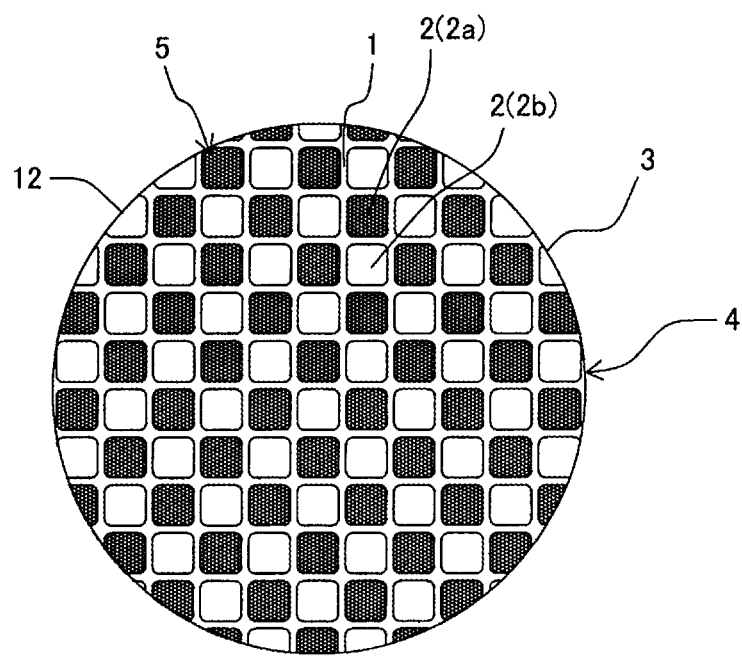
FIG. 4 is a schematic plan view of the plugged honeycomb structure shown in FIG. 1 and seen from the outflow end face side.
Figure 5:
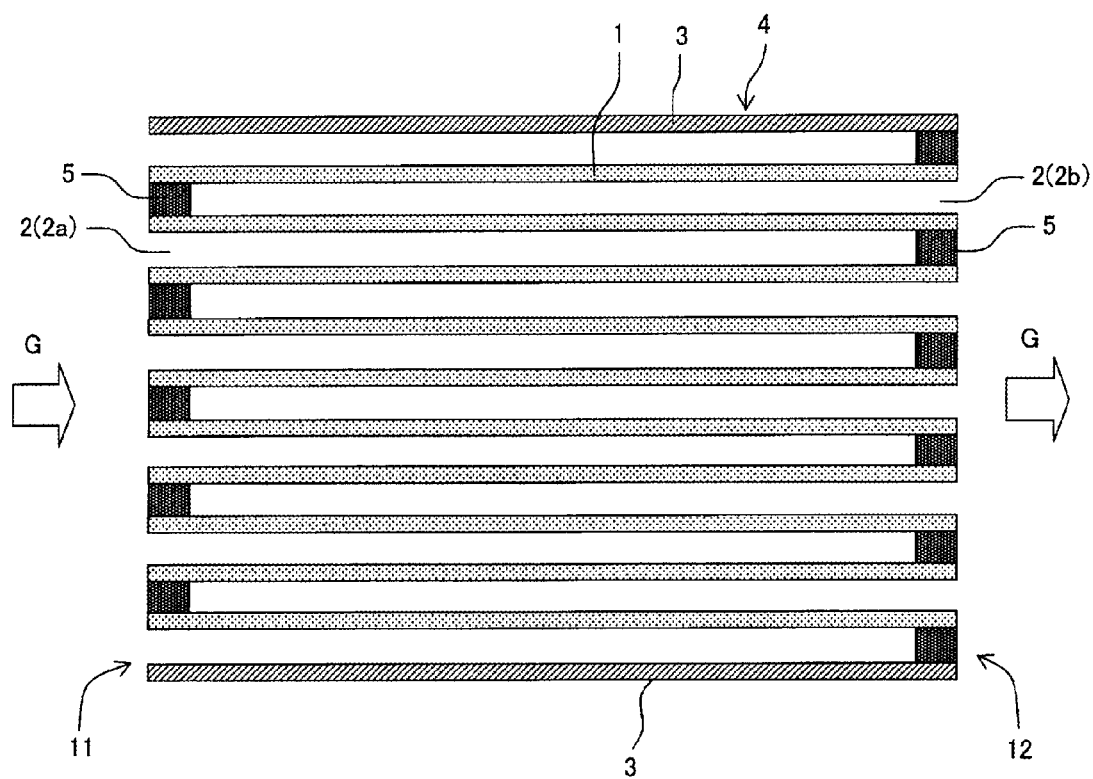
FIG. 5 is a schematic sectional view showing a cross section of the plugged honeycomb structure shown in FIG. 1 which is parallel to a cell extending direction.

Here, FIG. 1 is a schematic perspective view of one embodiment of the plugged honeycomb structure of the present invention seen from an inflow end face side. FIG. 2 is a schematic perspective view of the plugged honeycomb structure shown in FIG. 1 and seen from an outflow end face side. FIG. 3 is a schematic plan view of the plugged honeycomb structure shown in FIG. 1 and seen from the inflow end face side. FIG. 4 is a schematic plan view of the plugged honeycomb structure shown in FIG. 1 and seen from the outflow end face side. FIG. 5 is a schematic sectional view showing a cross section of the plugged honeycomb structure shown in FIG. 1, which is parallel to a cell extending direction. In FIG. 5, a reference sign G shows a fluid (e.g., the exhaust gas) passing through the cells, and the fluid moves in a direction of arrows denoted with the reference sign G.

In the plugged honeycomb structure 100, the partition walls 1 are constituted of a porous body including $\alpha\text{-}Al_2O_3$ as a main phase and further including aluminum titanate and glass. Such a porous body has a higher heat capacity per unit volume of a material constituting the porous body as compared with a partition wall material for use in a heretofore known plugged honeycomb structure. In the plugged honeycomb structure 100, the heat capacity per unit volume of the material constituting the porous body is high, and hence there is produced a remarkable effect that the plugged honeycomb structure can inhibit a temperature rise during the use at high temperatures and is excellent in thermal shock resistance. Therefore, when the plugged honeycomb structure 100 of the present embodiment is used as a DPF, it is possible to inhibit a temperature rise during regeneration of the DPF and, for example, even when the number of times to regenerate the DPF is decreased, damages due to thermal shock are not easily generated.

Here, "the heat capacity per unit volume of the material" means a heat capacity measured in a dense material in which any pores or the like are not formed. For example, in the porous body, the pores formed in the porous body are not taken into consideration, and hence the heat capacity is a heat capacity of the material itself constituting the porous body. Hereinafter, in the present description, the heat capacity in which the pores formed in the porous body are taken into consideration will be described as "the heat capacity per unit volume of the porous body", and distinguished from the abovementioned "heat capacity per unit volume of the material". "The heat capacity per unit volume of the material" is referred to simply as "the heat capacity of the material" sometimes. "The heat capacity per unit volume of the porous body" is referred to simply as "the heat capacity of the porous body" sometimes. In the present description, "the heat capacity" is a heat capacity at 600° C. unless otherwise specifically noted. In the present description, a value of each of "the heat capacity" and "the heat capacity per unit volume" is indicated as the heat capacity ($J/K/cm^3$) per 1 $cm^3$ unless otherwise specifically noted.

"The main phase" in the porous body constituting the partition walls 1 is a substance having a mass ratio of 40 mass % or more. On the other hand, a substance which has a mass ratio smaller than 20 mass %, does not correspond to the abovementioned main phase and is identified by X-ray diffraction method is referred to "a sub phase" sometimes. In the plugged honeycomb structure of the present embodiment, the glass and the like included in the porous body correspond to the sub phase. It is to be noted that "the main phase" in the porous body is not limited to one type. Furthermore, when two types of substances satisfying the above conditions are present, both the two types of substances belong to "the main phase". In the present description, "the substance" means a substance which chemically has a constant composition and cannot be divided into two types or more of substances by a physical operation.

Furthermore, in the present description, "aluminum titanate" is indicated as "$Al_2TiO_5$" sometimes. Additionally, in the present description, a case where "$Al_2TiO_5$" or "$\alpha\text{-}Al_2O_3$" is described also includes a case where not only the components described in the above chemical formula is solid-dissolved but other components are also solid-dissolved. Examples of the other solid-dissolved components include Fe, Mg and Si.

A mass ratio ($\alpha\text{-}Al_2O_3/Al_2TiO_5$) between the $\alpha\text{-}Al_2O_3$ and aluminum titanate in the porous body is preferably from 60/40 to 90/10, further preferably from 70/30 to 90/10, and especially preferably from 80/20 to 90/10. For example, when a ratio of aluminum titanate included in the porous body is relatively excessively large (i.e., the ratio of $\alpha\text{-}Al_2O_3$ is relatively excessively small), the heat capacity per unit volume of the material constituting the porous body does not sufficiently improve sometimes. On the other hand, when the ratio of aluminum titanate included in the porous body is relatively excessively small (i.e., the ratio of $\alpha\text{-}Al_2O_3$ is relatively excessively large), an average thermal expansion coefficient of the porous body at 40 to 800° C. disadvantageously enlarges. In the plugged honeycomb structure of the present embodiment, a value of "F" shown in the following equation (2) is preferably 4.20 or more. Furthermore, when the heat capacity is low or the average thermal expansion coefficient enlarges, this value of "F" disadvantageously becomes smaller than 4.20.

$$F = C - 0.007 \times \alpha^2 \quad (2),$$

in which C is the heat capacity (J/K/cm$^3$) of the material constituting the porous body at 600° C. and $\alpha$ is the average thermal expansion coefficient (ppm/K) of the porous body at 40 to 800° C.

The mass ratio between $\alpha$-Al$_2$O$_3$ and aluminum titanate in the porous body can be obtained by the following method. First, a test piece to obtain the mass ratio is prepared by using the porous body constituting the partition walls of the plugged honeycomb structure. The test piece having a predetermined size can be cut out from the porous body. Next, the obtained test piece is pulverized into the form of powder. The test piece is prepared in the form of the powder and then a mass thereof is beforehand measured. The obtained powder is thrown into a liquid including hydrofluoric acid. The liquid including hydrofluoric acid is obtained by mixing hydrofluoric acid (a content ratio of 46%), sulfuric acid (a content ratio of 97%), hydrochloric acid (a content ratio of 36%) and distilled water at a volume ratio of 10:2:3:25. The powder is thrown into the liquid including hydrofluoric acid, and then the liquid is retained at 0° C. for 30 minutes to dissolve the glass in the powder. Afterward, the respective amounts of solute components in the liquid are measured, and the respective solute components are subjected to oxide conversion to obtain a total sum thereof as a glass amount. For example, Al is converted into Al$_2$O$_3$ as an oxide. In this way, the mass ratio of the glass included in the test piece can be obtained. Afterward, an amount of $\alpha$-Al$_2$O$_3$ in a residue is quantitatively determined by an internal standard method of X-ray diffraction (XRD). Furthermore, the balance in the residue is Al$_2$TiO$_5$. The above mass ratio can be obtained from the masses of $\alpha$-Al$_2$O$_3$ and Al$_2$TiO$_5$ which are measured as described above. Here, "the residue" means the powder after the glass in the powder is dissolved. Additionally, "the balance in the residue" means an amount obtained by subtracting the amount of $\alpha$-Al$_2$O$_3$ from the residue. In addition, "the internal standard method of the X-ray diffraction (XRD)" is a method in which an internal standard substance and a sample are mixed at a predetermined ratio, and a calibration curve is prepared by using a standard sample having a known concentration and analyzed by using the fact that a linear relation is obtained between a substance concentration and a diffraction intensity ratio.

In the porous body, at least one selected from a first group consisting of Fe, Mg and Si is preferably solid-dissolved into aluminum titanate. When the at least one selected from the first group is solid-dissolved into the aluminum titanate included in the porous body, a thermal decomposition resistance of the partition walls constituted of the porous body is improved.

The component solid-dissolved into the aluminum titanate can be analyzed by the following method. First, the partition walls of the plugged honeycomb structure are cut and a cut surface of the porous body constituting the partition walls is buried in a resin. Afterward, the cut surface of the porous body is polished and observed with a scanning electron microscope (hereinafter also referred to as an "SEM"). In an observed SEM image (5000 times), chemical compositions of respective portions of Al$_2$TiO$_5$ (aluminum titanate), $\alpha$-Al$_2$O$_3$ and glass are analyzed by energy dispersion type X-ray spectrometry (hereinafter also referred to as an "EDS"). The chemical compositions of the respective portions of aluminum titanate, $\alpha$-Al$_2$O$_3$ and glass can be analyzed by such a method.

Figure 7:
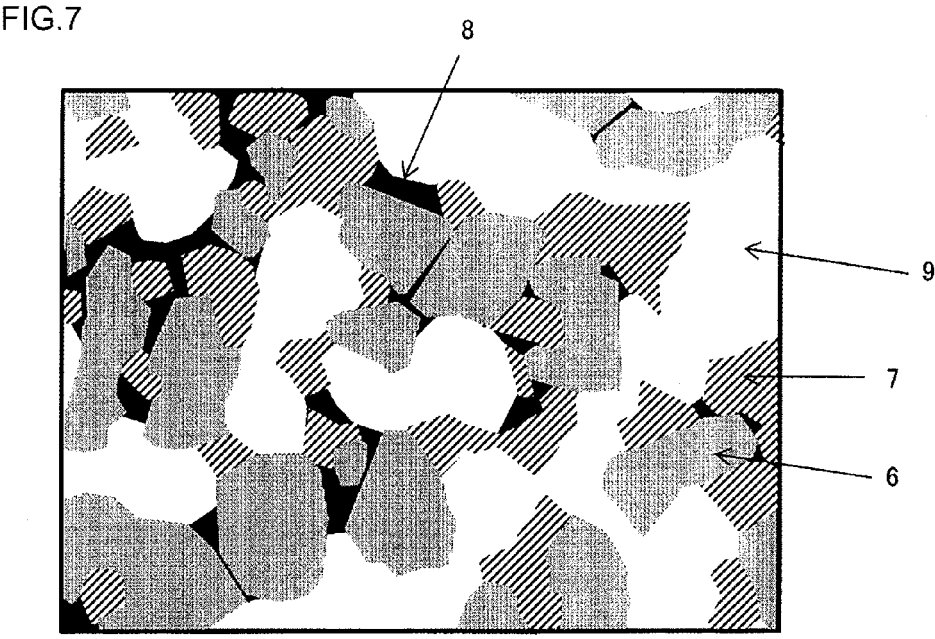
FIG. 7 is a schematic view showing one example of an SEM photograph of a porous body in the one embodiment of the plugged honeycomb structure of the present invention.

For example, FIG. 7 shows an SEM image (an SEM photograph) in which the porous body constituting the partition walls is observed. FIG. 7 is a schematic view showing one example of the SEM photograph of the porous body in the one embodiment of the plugged honeycomb structure of the present invention. The SEM photograph is a photograph imaged by a scanning electron microscope. As shown in FIG. 7, the porous body includes "$\alpha$-Al$_2$O$_3$" denoted with reference numeral 6, "aluminum titanate" denoted with reference numeral 7 and "glass" denoted with reference numeral 8. Furthermore, in the porous body, a plurality of "pores" denoted with reference numeral 9 are formed.

A solid solution amount of the component included in the first group and solid-dissolved into the aluminum titanate is preferably from 0.1 to 10.0 mass %, further preferably from 0.1 to 5.0 mass %, and especially preferably from 0.5 to 3.0 mass %. "The solid solution amount (mass %) of the component included in the first group" means a mass ratio (mass %) described as follows. First, a denominator of the mass ratio (mass %) indicated by the solid solution amount is a total of masses of Al$_2$O$_3$ and TiO$_2$ obtained by oxide conversion of Al and Ti included in aluminum titanate and a mass of the component solid-dissolved into the aluminum titanate which is obtained by the oxide conversion. Furthermore, "the solid solution amount (mass %) of the component included in the first group" is a ratio (mass %) of the mass of each of Fe$_2$O$_3$, MgO and SiO$_2$ obtained by the oxide conversion of Fe, Mg and Si among solid-solution components included in the aluminum titanate to the total of masses. That is, in the present description, "the solid solution amount (mass %)" means the mass ratio (mass %) in oxide conversion of the solid-solution component. The above solid-solution components are all the components solid-dissolved into the aluminum titanate, and also include components other than the components included in the first group. When the solid-solution amount of the component included in the above first group is smaller than 0.1 mass %, a suitable effect by this solid-solution component is not sufficiently exerted sometimes. When the above solid-solution amount of the component included in the first group is in excess of 10.0 mass %, the average thermal expansion coefficient enlarges sometimes. The solid-solution amount of the component included in the above first group is obtained by measuring any ten points of the portion of the aluminum titanate and calculating an average value of component ratios of the points in the EDS to analyze the abovementioned chemical composition of the aluminum titanate. The above solid-solution amount can be obtained from the obtained component ratio.

The porous body constituting the partition walls includes preferably 5 to 15 mass %, further preferably 5 to 12 mass % and especially preferably 7 to 12 mass % of the glass to 100 mass % in total of $\alpha$-Al$_2$O$_3$, aluminum titanate and glass. When the content ratio of the glass is smaller than 5 mass % to the total of 100 mass % of $\alpha$-Al$_2$O$_3$, aluminum titanate and glass, a porosity of the partition walls (i.e., the porous body) heightens, and a strength of the plugged honeycomb structure lowers sometimes. When the content ratio of the glass is in excess of 15 mass % to the total of 100 mass % of $\alpha$-Al$_2$O$_3$, aluminum titanate and glass, the heat capacity per unit volume of the material constituting the porous body does not sufficiently improve sometimes. The content ratio of the glass in the porous body can be obtained from a mass of the glass dissolved in an acid solution when the abovementioned mass ratios of α-$Al_2O_3$ and aluminum titanate are obtained. It is to be noted that in the present description, the glass is an oxide which does not have a specific diffraction pattern in the XRD.

The glass included in the porous body may include $SiO_2$ and $Al_2O_3$. When the glass includes $SiO_2$ and $Al_2O_3$, a strength of the partition walls constituted of the porous body improves. Furthermore, the glass may further include an oxide made of at least one selected from the group consisting of an alkali metal, an alkali earth metal, Ti and Fe. When the glass further includes the at least one selected from the above group, the strength of the partition walls further preferably improves. The respective components included in the glass can be analyzed by a method similar to the method of analyzing the component solid-dissolved into the aluminum titanate. That is, the chemical composition of the glass portion is analyzed by the EDS in the SEM image when the component solid-dissolved into the aluminum titanate is analyzed, so that the respective components can qualitatively be determined.

A true density of a material constituting the porous body is preferably from 3.65 to 3.85 g/$cm^3$, further preferably from 3.70 to 3.85 g/$cm^3$, and especially preferably from 3.75 to 3.85 g/$cm^3$. When the true density of the material constituting the porous body is in the abovementioned numeric range, the porous body suitably contains less glass. For example, when the true density of the material constituting the porous body is smaller than 3.65 g/$cm^3$, the heat capacity is disadvantageously excessively small sometimes, and when the true density is in excess of 3.85 g/$cm^3$, the strength disadvantageously excessively lowers or the average thermal expansion coefficient disadvantageously excessively enlarges sometimes. The true density of the material constituting the porous body can be measured in conformity with JIS R 1634 by Archimedes method.

The heat capacity of the material constituting the porous body at 600° C. is preferably from 4.25 to 4.50 J/K/$cm^3$, further preferably from 4.30 to 4.50 J/K/$cm^3$, and especially preferably from 4.35 to 4.50 J/K/$cm^3$. When the heat capacity of the material constituting the porous body at 600° C. is in excess of 4.50 J/K/$cm^3$, a balance with the average thermal expansion coefficient unfavorably worsens. On the other hand, when the heat capacity of the material constituting the porous body at 600° C. is smaller than 4.25 J/K/$cm^3$, an effect of inhibiting the temperature rise deteriorates sometimes.

The heat capacity of the material constituting the porous body at 600° C. can be obtained by the following method. First, a heat capacity (J/K/g) per unit mass of the material constituting the porous body at 600° C. is measured by using an adiabatic specific heat measurement apparatus manufactured by ULVAC-RICO, Inc. The obtained heat capacity (J/K/g) per unit mass is multiplied by a true density (g/$cm^3$) of the material constituting the porous body which is measured at room temperature by the Archimedes method, to calculate the heat capacity (J/K/$cm^3$) per unit volume of the material constituting the porous body. To measure the heat capacity, a sample having a predetermined size is cut out from the porous body constituting the partition walls so that the heat capacity can be measured by using the sample.

The average thermal expansion coefficient of the porous body at 40 to 800° C. is preferably from 2.5 to 6.0 ppm/K, further preferably from 3.0 to 5.0 ppm/K, and especially preferably from 4.0 to 5.0 ppm/K. When the average thermal expansion coefficient of the porous body at 40 to 800° C. is in the above numeric range, the plugged honeycomb structure becomes excellent in thermal shock resistance. When the average thermal expansion coefficient is smaller than 2.5 ppm/K, the heat capacity unfavorably becomes excessively small sometimes. When the average thermal expansion coefficient is in excess of 6.0 ppm/K, the thermal shock resistance unfavorably excessively lowers. The average thermal expansion coefficient can be measured by using a differential detection type of thermal dilatometer.

The porous body preferably satisfies a relation of the following equation (3):

$$C - 0.007 \times \alpha^2 \geq 4.20 \qquad (3),$$

in which C is the heat capacity (J/K/$cm^3$) of the material constituting the porous body at 600° C. and α is the average thermal expansion coefficient (ppm/K) of the porous body at 40 to 800° C.

When the porous body satisfies the above relation of Equation (3), in the plugged honeycomb structure of the present embodiment, both the heat capacity (J/K/$cm^3$) of the material constituting the porous body at 600° C. and the average thermal expansion coefficient (ppm/K) of the porous body at 40 to 800° C. have suitable values. That is, the heat capacity (J/K/$cm^3$) is a parameter effective for the inhibition of the temperature rise of the plugged honeycomb structure, and the average thermal expansion coefficient (ppm/K) is a parameter effective for the improvement of the thermal shock resistance of the plugged honeycomb structure. Furthermore, when the porous body satisfies the above relation of Equation (3), a balance between the inhibiting effect of the temperature rise and the improving effect of the thermal shock resistance can be achieved.

A porosity of the porous body is preferably from 20 to 50%, further preferably from 20 to 45%, and especially preferably from 25 to 45%. When the porosity of the porous body is smaller than 20%, a pressure loss of the plugged honeycomb structure enlarges sometimes. When the porosity of the porous body is in excess of 50%, the partition walls of the plugged honeycomb structure become brittle and easily lacking sometimes. Furthermore, when the porosity of the porous body is excessively high, the heat capacity of the porous body becomes smaller, and hence the temperature of the plugged honeycomb structure easily rises. The porosity of the porous body is the porosity of the partition walls of the plugged honeycomb structure. The porosity of the porous body can be measured in conformity with JIS R 1634 by the Archimedes method.

An average pore diameter of the porous body is preferably from 5 to 20 μm, further preferably from 8 to 15 μm, and especially preferably from 8 to 12 μm. When the average pore diameter of the porous body is smaller than 5 μm, the pressure loss of the plugged honeycomb structure enlarges sometimes. When the average pore diameter of the porous body is in excess of 20 μm and when the plugged honeycomb structure is used as a filter such as the DPF, a part of PM in the exhaust gas passes the partition walls and hence a trapping efficiency of the filter deteriorates sometimes. The average pore diameter of the porous body can be measured in conformity with JIS R 1655 by mercury porosimetry.

Figure 6:
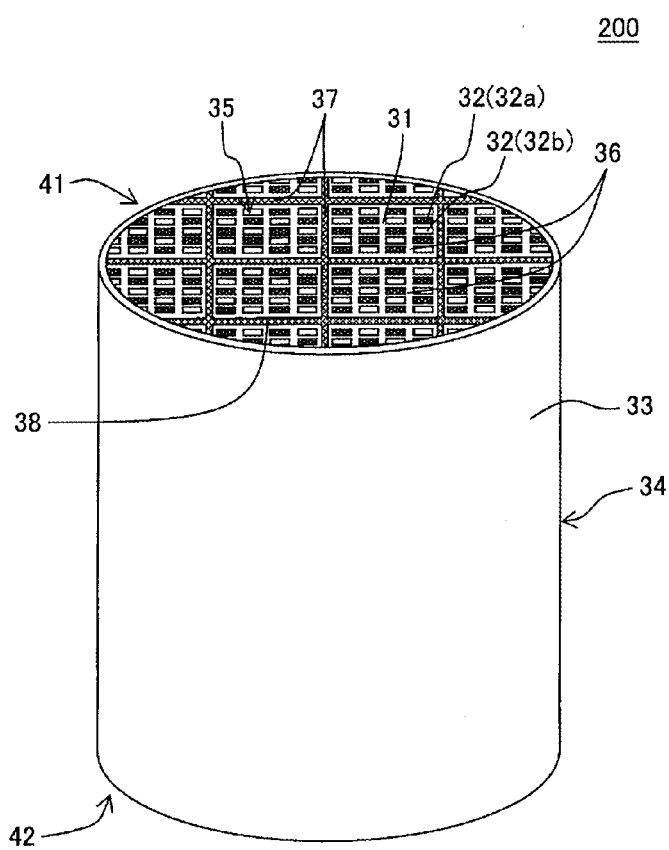
FIG. 6 is a schematic perspective view of another embodiment of the plugged honeycomb structure of the present invention seen from an inflow end face side.

In addition, the honeycomb structure body of the plugged honeycomb structure may be a segmented structure having a plurality of pillar-shaped honeycomb segments which have the partition walls and in which the plurality of honeycomb segments are bonded in a state where the honeycomb segments are disposed adjacent to one another so that side surfaces of the honeycomb segments face one another. An example of the plugged honeycomb structure including the honeycomb structure body of the segmented structure is such a plugged honeycomb structure 200 as shown in FIG. 6. The plugged honeycomb structure 200 shown in FIG. 6 includes a honeycomb structure body 34 in which a plurality of honeycomb segments 36 are bonded by a bonding layer 37 in a state where the honeycomb segments are disposed adjacent to one another so that side surfaces of the honeycomb segments face one another. Each of the honeycomb segments 36 has porous partition walls 31 defining a plurality of cells 32 (cells 32a and cells 32b) which extend from a first end face 41 to a second end face 42 and become through channels for a fluid, and outer walls 38 disposed to surround the partition walls 31. By the bonding layer 37, the outer walls 38 of the honeycomb segments 36 disposed adjacent to one another are bonded to one another. The bonding layer 37 may have a function of a buffer material to buffer a heat stress generated in the honeycomb structure body 34. In the plugged honeycomb structure 200 shown in FIG. 6, a circumferential wall 33 is disposed at an outermost circumference of a bonded body in which the plurality of honeycomb segments 36 are bonded.

In the honeycomb structure body of the segmented structure, the partition walls of at least one of the plurality of honeycomb segments are preferably constituted of a porous body including $\alpha$-$Al_2O_3$ as a main phase and further including aluminum titanate and glass. In the honeycomb structure body of the segmented structure, the partition walls of all the honeycomb segments may be constituted of the porous body including $\alpha$-$Al_2O_3$ as the main phase and further including aluminum titanate and glass. As to the bonding layer, a bonding layer having a constitution similar to a bonding layer in a honeycomb structure body of a heretofore known segmented structure is usable.

The plugged honeycomb structure 200 shown in FIG. 6 may be prepared by obtaining the bonded body in which the plurality of honeycomb segments 36 are bonded and processing a circumferential portion of the obtained bonded body by grinding or the like. The circumferential portion of the bonded body is processed, so that a shape of a cross section of the bonded body which is perpendicular to an extending direction of the cells 32 can be a desirable shape such as a circular shape. The circumferential portion of the bonded body is processed, and then the circumferential wall 33 may be disposed by applying a ceramic material to the outermost circumference. FIG. 6 is a schematic perspective view of another embodiment of the plugged honeycomb structure of the present invention seen from an inflow end face side. In FIG. 6, reference numeral 35 is "a plugging portion" disposed in an open end of the cell 32. Even in such a plugged honeycomb structure of the so-called segmented structure, an operation effect similar to that of a so-called monolithic plugged honeycomb structure shown in FIG. 1 to FIG. 5 can be obtained.

There is not any special restriction on a thickness of the partition walls of the honeycomb structure body, but the thickness is preferably from 100 to 500 further preferably from 150 to 400 and especially preferably from 150 to 300 μm. When the thickness of the partition walls is in such a range, a rise of the pressure loss can be inhibited while keeping the strength of the partition walls of the plugged honeycomb structure.

There is not any special restriction on a cell density of the honeycomb structure body, but the cell density is preferably from 15 to 100 cells/cm$^2$, further preferably from 30 to 65 cells/cm$^2$, and especially preferably from 30 to 50 cells/cm$^2$. When the cell density is in such a range and when the plugged honeycomb structure is used in the DPF or the like, the trapping efficiency can be improved while inhibiting the pressure loss.

There is not any special restriction on a shape of each cell formed in the honeycomb structure body. Here, "the cell shape" is the shape of the cells in a cross section of the honeycomb structure body which is perpendicular to the cell extending direction. Examples of the cell shape include a quadrangular shape, a hexagonal shape, an octagonal shape, and any combination of these shapes.

There is not any special restriction on a shape of the honeycomb structure body, and examples of the shape include a pillar shape (a columnar shape) in which a bottom surface is circular, a pillar shape in which a bottom surface is oval, and a pillar shape in which a bottom surface has a polygonal shape (a quadrangular shape, a pentangular shape, a hexagonal shape, a heptagonal shape, an octagonal shape or the like).

A length from the first end face to the second end face of the honeycomb structure body and a size of the cross section of the honeycomb structure body which is perpendicular to the cell extending direction may suitably be selected so that an optimum purification performance can be obtained when the plugged honeycomb structure of the present embodiment is used as an exhaust gas purifying filter. For example, the length from the first end face to the second end face of the honeycomb structure body is preferably from 100 to 500 mm and further preferably from 100 to 300 mm. An area of the cross section of the honeycomb structure body which is perpendicular to the cell extending direction is preferably from 7000 to 70000 mm$^2$ and further preferably from 7000 to 30000 mm$^2$.

The exhaust gas purifying catalyst may be loaded onto at least one of each surface of the partition walls of the honeycomb structure body and each pore of the partition walls. An example of the catalyst is a platinum group metal loaded onto porous $\gamma$-$Al_2O_3$. It is to be noted that the catalyst loaded onto the partition walls of the honeycomb structure body is a constitutional element different from the partition walls (i.e., the porous body), and hence the hitherto described "material constituting the porous body" does not include this catalyst.

Next, a manufacturing method of the plugged honeycomb structure of the present embodiment will be described. When the plugged honeycomb structure is manufactured, there is first prepared a forming raw material to prepare the porous body including aluminum titanate, $\alpha$-$Al_2O_3$ and glass. There is not any special restriction on the forming raw material, as long as a fired body (the porous body) obtained by firing the forming raw material can include the above three substances. For example, the forming raw material can be prepared by blending desirable amounts of $Al_2O_3$, $TiO_2$, talc, mica, clay and the like. Furthermore, as the forming raw material, it is possible to use $Al(OH)_3$, forsterite, feldspar, kaolin, $Na_2O$, $K_2O$, $MgO$, $CaO$, $SrO$, $Fe_2O_3$, $Y_2O_3$, $La_2O_3$, $Ga_2O_3$, $ZrO_2$, $CeO_2$, $SiO_2$, $CuO$, $NiO$, a carbonate thereof, a hydroxide thereof, a chloride thereof, glass having a regulated desirable composition or the like. Amounts of the abovementioned raw materials to be blended are adjusted, so that substances and ratios of the substances to be included in the obtained porous body can be regulated. It is to be noted that the amount of the forming raw material to be blended is adjusted so that at least $\alpha$-$Al_2O_3$ constitutes the main phase (i.e., a mass ratio of 40 mass % or more) in the obtained fired body. Additionally, a dispersing medium or an additive may further be added to the forming raw material, in addition to the abovementioned raw materials.

Examples of the additive include a binder and a pore former. An example of the dispersing medium is water.

Examples of the binder include methylcellulose, hydroxypropoxyl cellulose, hydroxyethyl cellulose, carboxymethylcellulose, and polyvinyl alcohol. There is not any special restriction on the pore former, as long as the pore former becomes pores after fired, and examples of the pore former include starch, a foamable resin, a water absorbable resin, and silica gel.

Particle diameters and an amount of powder of the abovementioned raw material, as well as particle diameters and an amount of powder of the pore former to be added are regulated, so that the porous body having desirable porosity and average pore diameter can be obtained.

Next, the obtained forming raw material is kneaded to form a kneaded material. There is not any special restriction on a method of forming the kneaded material, and an example of the method is a method in which a kneader, a vacuum pugmill or the like is used.

Next, the obtained kneaded material is extruded to prepare a honeycomb formed body. The extrusion can be performed by using a die having a desirable cell shape, partition wall thickness and cell density. Next, the obtained honeycomb formed body may be dried to obtain a honeycomb dried body prepared by drying the honeycomb formed body. There is not any special restriction on a drying method, but examples of the method include hot air drying, microwave drying, dielectric drying, reduced-pressure drying, vacuum drying, and freeze drying. Among these methods, the dielectric drying, the microwave drying or the hot air drying is preferably performed alone or any combination thereof is preferably performed. Furthermore, as drying conditions, a drying temperature is preferably set to 30 to 150° C. and a drying time is preferably set to one minute to two hours.

Next, open ends of cells of the obtained honeycomb formed body or the honeycomb dried body obtained by drying the honeycomb formed body are plugged by a plugging material. An example of a method of plugging the open ends of the cells is a method in which the plugging material is charged into the open ends of the cells. The method of charging the plugging material can be performed in conformity with a heretofore known manufacturing method of the plugged honeycomb structure. As a ceramic raw material to form the plugging material, a ceramic raw material for use in the heretofore known manufacturing method of the plugged honeycomb structure is usable, but the same ceramic raw material as in the honeycomb formed body (or the honeycomb dried body) is preferably used. It is to be noted that for the purpose of adjusting a porosity, pore diameters and the like of plugging portions formed by using the plugging material, there may suitably be changed particle diameters and an amount of powder of the ceramic raw material, as well as particle diameters and an amount of powder of a pore former to be added.

Next, the honeycomb formed body (or the honeycomb dried body) in which the plugging material is charged into the open ends of the cells is fired. The obtained honeycomb fired body becomes the plugged honeycomb structure of the present embodiment. A firing temperature is preferably from 1400 to 1600° C. and further preferably from 1400 to 1500° C. Furthermore, a firing time is preferably from about one to ten hours. The firing can be performed in, for example, an air atmosphere, a steam atmosphere, or a hydrocarbon gas combustion atmosphere.

Prior to forming the plugging portions in the honeycomb formed body, the honeycomb formed body may be fired to obtain the honeycomb fired body, and the plugging portions may be formed in open ends of cells of the obtained honeycomb fired body, further followed by the firing, so that the plugged honeycomb structure can be obtained. As described above, the plugged honeycomb structure of the present embodiment can be manufactured.

EXAMPLES

Hereinafter, the present invention will further specifically be described in accordance with examples, but the present invention is not limited to these examples.

In the examples described as follows, a forming raw material was prepared by using raw material powders in which $\alpha\text{-Al}_2\text{O}_3$ powder, $\text{TiO}_2$ powder, talc powder, mica powder and clay were raw materials as shown in Table 1. Table 1 shows a type of raw material powder for use in the forming raw material, a chemical composition (mass %) of the powder, and an average particle diameter (μm) of the powder. The chemical composition of the raw material powder shown in Table 1 was obtained by fluorescent X-ray spectroscopy. The average particle diameter of the raw material powder shown in Table 1 was obtained by laser diffractometry. In Table 1, (1) to (4) of $\alpha\text{-Al}_2\text{O}_3$ show $\alpha\text{-Al}_2\text{O}_3$ raw material powders having different chemical compositions and average particle diameters. In Table 1, (1) and (2) of talc show talc raw material powders having different chemical compositions and average particle diameters. As compared with (1) of $\alpha\text{-Al}_2\text{O}_3$, (2) of $\alpha\text{-Al}_2\text{O}_3$ has a lower purity of alumina ($\text{Al}_2\text{O}_3$). As compared with (1) of $\alpha\text{-Al}_2\text{O}_3$, (3) of $\alpha\text{-Al}_2\text{O}_3$ has a smaller average particle diameter. As compared with (1) of $\alpha\text{-Al}_2\text{O}_3$, (4) of $\alpha\text{-Al}_2\text{O}_3$ has a larger average particle diameter. As compared with (1) of talc, (2) of talc includes a larger amount of iron oxide ($\text{Fe}_2\text{O}_3$) and has a larger average particle diameter.

TABLE 1

| | | Chemical composition (mass %) | | | | | | | | Ave. particle dia. (μm) |
|---|---|---|---|---|---|---|---|---|---|---|
| | | $SiO_2$ | $Al_2O_3$ | $Fe_2O_3$ | $TiO_2$ | CaO | MgO | $K_2O$ | $Na_2O$ | |
| $\alpha\text{-Al}_2\text{O}_3$ | (1) | 0.0 | 99.0 | 0.0 | 0.0 | 0.0 | 0.0 | 0.0 | 0.1 | 32 |
| | (2) | 1.3 | 93.7 | 0.2 | 3.7 | 0.3 | 0.5 | 0.0 | 0.1 | 31 |
| | (3) | 0.0 | 99.2 | 0.0 | 0.0 | 0.0 | 0.0 | 0.0 | 0.2 | 21 |
| | (4) | 0.0 | 99.0 | 0.0 | 0.0 | 0.0 | 0.0 | 0.0 | 0.1 | 42 |
| $TiO_2$ | | 0.0 | 0.0 | 0.0 | 100.0 | 0.0 | 0.0 | 0.0 | 0.0 | 0.4 |
| Talc | (1) | 61.0 | 0.9 | 1.0 | 0.0 | 0.1 | 31.3 | 0.0 | 0.0 | 3 |
| | (2) | 62.7 | 0.2 | 2.3 | 0.0 | 0.1 | 30.1 | 0.0 | 0.0 | 11 |
| Mica | | 47.0 | 33.6 | 2.3 | 0.5 | 0.1 | 1.1 | 9.5 | 0.6 | 42 |
| Clay | | 61.6 | 21.6 | 2.0 | 0.1 | 0.6 | 3.6 | 0.1 | 3.5 | 2 |

Example 1

In Example 1, a forming raw material was prepared by using (1) of α-Al$_2$O$_3$, TiO$_2$, (1) of talc, and mica shown in Table 1. Table 2 shows a formula (unit: g) of the forming raw material of Example 1. Furthermore, a column of "Al$_2$O$_3$/TiO$_2$" of Table 2 shows a molar ratio (Al$_2$O$_3$/TiO$_2$) between "Al$_2$O$_3$" included in powder of α-Al$_2$O$_3$ and "TiO$_2$" included in powder of TiO$_2$ for use in the forming raw material of Example 1.

In Example 1, in addition to raw materials shown in the formulae of Table 2, 50 g of starch as a pore former, 200 g of methylcellulose as a binder and an appropriate amount of water were added.

TABLE 2

| | α-Al$_2$O$_3$ | | | | TiO$_2$ | Talc | | Mica | Clay | Al$_2$O$_3$/TiO$_2$ |
| | (1) (g) | (2) (g) | (3) (g) | (4) (g) | (g) | (1) (g) | (2) (g) | (g) | (g) | (molar ratio) |
|---|---|---|---|---|---|---|---|---|---|---|
| Example 1 | 3250 | — | — | — | 1250 | 350 | — | 150 | — | 67/33 |
| Example 2 | 3500 | — | — | — | 1000 | 350 | — | 150 | — | 73/27 |
| Example 3 | 3750 | — | — | — | 750 | 350 | — | 150 | — | 80/20 |
| Example 4 | 3850 | — | — | — | 650 | 350 | — | 150 | — | 82/18 |
| Example 5 | 3000 | — | — | — | 1500 | 350 | — | 150 | — | 61/39 |
| Example 6 | 4000 | — | — | — | 500 | 350 | — | 150 | — | 86/14 |
| Example 7 | 4000 | — | — | — | 800 | 150 | — | 50 | — | 80/20 |
| Example 8 | 3900 | — | — | — | 750 | 300 | — | 50 | — | 80/20 |
| Example 9 | 3050 | — | — | — | 1200 | 350 | — | 400 | — | 67/33 |
| Example 10 | — | 3900 | — | — | 750 | 300 | — | 50 | — | 79/21 |
| Example 11 | — | — | 3900 | — | 750 | 300 | — | 50 | — | 80/20 |
| Example 12 | — | — | — | 3900 | 750 | 300 | — | 50 | — | 80/20 |
| Example 13 | 3900 | — | — | — | 750 | — | 300 | 50 | — | 80/20 |
| Example 14 | 3900 | — | — | — | 750 | 300 | — | — | 50 | 80/20 |
| Example 15 | 3900 | — | — | — | 750 | 300 | — | 50 | — | 80/20 |

Next, the obtained forming raw material was kneaded with a kneader and then kneaded with a vacuum pugmill to form a kneaded material. Next, the obtained kneaded material was extruded to prepare a honeycomb formed body. As to the honeycomb formed body after fired, a partition wall thickness became 300 μm and a cell density became 46.5 cells/cm$^2$. A cell shape of the honeycomb formed body became square after fired. Next, the honeycomb formed body was dried to obtain a honeycomb dried body. As to the drying, microwave drying was first performed and then hot air drying was performed. Next, plugging portions were disposed in open ends of cells of the obtained honeycomb dried body. Next, the obtained honeycomb dried body was degreased. The degreasing was performed at 450° C. in the air atmosphere for five hours. Next, the degreased honeycomb dried body was fired to obtain a plugged honeycomb structure. The firing was performed at 1500° C. in the air atmosphere for four hours.

A composition of partition walls (a porous body) constituting the plugged honeycomb structure of Example 1 was qualitatively and quantitatively determined by the following method. Table 3 shows the composition of the partition walls (the porous body) constituting the plugged honeycomb structure of Example 1. It is to be noted that a column of "α-Al$_2$O$_3$/Al$_2$TiO$_5$" of Table 3 shows a value of a mass ratio (α-Al$_2$O$_3$/Al$_2$TiO$_5$) between α-Al$_2$O$_3$ and Al$_2$TiO$_5$. When the composition of the partition walls (the porous body) was qualitatively and quantitatively determined, an amount of glass was first quantitatively determined by immersing the partition walls constituting the obtained plugged honeycomb structure into an acid and dissolving the glass in the partition walls. Afterward, an amount of α-Al$_2$O$_3$ in a residue was quantitatively determined by XRD and a balance was Al$_2$TiO$_5$. A true density (g/cm$^3$) and a porosity (%) were measured by Archimedes method (JIS R 1634). An average pore diameter (μm) was measured by mercury porosimetry PIS R 1655).

A heat capacity (J/K/cm$^3$) was measured by the following method. First, a heat capacity (J/K/g) per unit mass of a material constituting the porous body at 600° C. was measured by using an adiabatic specific heat measurement system manufactured by ULVAC-RICO, Inc. Next, the obtained heat capacity (J/K/g) per unit mass was multiplied by a true density (g/cm$^3$) of the material constituting the porous body which was measured at room temperature by the Archimedes method, to calculate the heat capacity (J/K/cm$^3$) per unit volume of the material constituting the porous body.

"CTE (ppm/K)" of Table 3 is an average thermal expansion coefficient (ppm/K). The average thermal expansion coefficient of the porous body was obtained by measuring the average thermal expansion coefficient at 40 to 800° C. with a differential detection type of thermal dilatometer.

"F" of Table 3 shows a value of "C−0.007×α$^2$", in which C is the heat capacity (J/K/cm$^3$) of the material constituting the porous body at 600° C. and α is the average thermal expansion coefficient (ppm/K) of the porous body at 40 to 800° C.

TABLE 3

| | α-Al$_2$O$_3$ (mass %) | Al$_2$TiO$_5$ (mass %) | Glass (mass %) | α-Al$_2$O$_3$/Al$_2$TiO$_5$ (mass %) | True density (g/cm$^3$) | Porosity (%) | Ave. pore dia. (μm) | Heat capacity (J/K/cm$^3$) | CTE (ppm/K) | F |
|---|---|---|---|---|---|---|---|---|---|---|
| Example 1 | 57 | 33 | 10 | 63/37 | 3.71 | 30 | 9 | 4.26 | 2.57 | 4.21 |
| Example 2 | 64 | 26 | 10 | 71/29 | 3.73 | 28 | 9 | 4.32 | 3.06 | 4.25 |
| Example 3 | 76 | 14 | 10 | 84/16 | 3.76 | 26 | 9 | 4.41 | 4.48 | 4.27 |
| Example 4 | 79 | 12 | 10 | 87/13 | 3.77 | 25 | 9 | 4.43 | 5.60 | 4.21 |

TABLE 3-continued

|  | α-Al$_2$O$_3$ (mass %) | Al$_2$TiO$_5$ (mass %) | Glass (mass %) | α-Al$_2$O$_3$/Al$_2$TiO$_5$ (mass %) | True density (g/cm$^3$) | Porosity (%) | Ave. pore dia. (μm) | Heat capacity (J/K/cm$^3$) | CTE (ppm/K) | F |
|---|---|---|---|---|---|---|---|---|---|---|
| Example 5 | 49 | 42 | 10 | 54/46 | 3.69 | 24 | 10 | 4.20 | 2.30 | 4.16 |
| Example 6 | 82 | 8 | 10 | 91/9 | 3.78 | 32 | 9 | 4.46 | 7.56 | 4.06 |
| Example 7 | 81 | 15 | 4 | 84/16 | 3.87 | 39 | 9 | 4.55 | 4.43 | 4.41 |
| Example 8 | 79 | 14 | 7 | 85/15 | 3.82 | 32 | 9 | 4.49 | 4.19 | 4.37 |
| Example 9 | 53 | 33 | 14 | 62/38 | 3.62 | 20 | 9 | 4.16 | 2.80 | 4.11 |
| Example 10 | 73 | 17 | 10 | 81/19 | 3.75 | 26 | 10 | 4.38 | 3.62 | 4.29 |
| Example 11 | 79 | 14 | 7 | 85/15 | 3.82 | 28 | 8 | 4.49 | 4.65 | 4.34 |
| Example 12 | 79 | 14 | 7 | 85/15 | 3.82 | 33 | 10 | 4.49 | 4.70 | 4.34 |
| Example 13 | 79 | 14 | 7 | 85/15 | 3.82 | 32 | 10 | 4.49 | 4.68 | 4.34 |
| Example 14 | 77 | 17 | 7 | 82/18 | 3.82 | 30 | 9 | 4.47 | 4.31 | 4.34 |
| Example 15 | 79 | 14 | 7 | 85/15 | 3.82 | 43 | 15 | 4.49 | 4.73 | 4.33 |

The partition walls (the porous body) constituting the plugged honeycomb structure of Example 1 were constituted of the porous body including α-Al$_2$O$_3$ as a main phase and further including Al$_2$TiO$_5$ and glass. As to a portion of Al$_2$TiO$_5$, a portion of α-Al$_2$O$_3$, and a portion of glass in the porous body, the chemical compositions (mass %) of the respective portions were measured. Table 4 shows the measurement results of the chemical compositions (mass %) of the respective portions of "α-Al$_2$O$_3$", "Al$_2$TiO$_5$" and "glass" of the partition walls (the porous body) constituting the plugged honeycomb structure of respective Examples. The chemical compositions shown in Table 4 were analyzed by the following method. First, the partition walls of the plugged honeycomb structure were cut and a cut surface of the porous body constituting the partition walls was buried in a resin. Afterward, the cut surface of the porous body was polished and the cut surface was observed with a scanning electron microscope (SEM). In an observed SEM image (5000 times), the chemical compositions of the respective portions of α-Al$_2$O$_3$, Al$_2$TiO$_5$ (aluminum titanate) and glass were analyzed by energy dispersion type X-ray spectrometry (EDS).

of each of Examples 2 to 15. Furthermore, the procedures of Example 1 were repeated to measure a true density (g/cm$^3$), a porosity (%), an average pore diameter (μm), a heat capacity (J/K/cm$^3$), and CTE (ppm/K). Table 3 shows the measurement results. In addition, "F" which was a value of "C−0.007×α$^2$" was also calculated. Table 3 shows the value of "F".

The partition walls (the porous body) constituting the plugged honeycomb structure of each of Examples 2 to 15 were constituted of the porous body including α-Al$_2$O$_3$ as a main phase and further including Al$_2$TiO$_5$ and glass. As to a portion of α-Al$_2$O$_3$, a portion of Al$_2$TiO$_5$ and a glass portion in the porous body, chemical compositions (mass %) of the respective portions were measured. Table 4 shows measurement results of chemical compositions (mass %) of the respective portions of "α-Al$_2$O$_3$", "Al$_2$TiO$_5$" and "glass" of the partition walls (the porous body) constituting the plugged honeycomb structure of each of Examples 2, 8, 10, 13 and 14.

TABLE 4

|  |  | Al$_2$O$_3$ (mass %) | SiO$_2$ (mass %) | K$_2$O (mass %) | TiO$_2$ (mass %) | Fe$_2$O$_3$ (mass %) | Na$_2$O (mass %) | MgO (mass %) | CaO (mass %) |
|---|---|---|---|---|---|---|---|---|---|
| Example 2 | Al$_2$O$_3$ | 95.7 | 3.6 | 0.0 | 0.4 | 0.0 | 0.3 | 0.0 | 0.0 |
|  | Al$_2$TiO$_5$ | 43.4 | 2.7 | 0.1 | 51.3 | 0.5 | 0.2 | 1.9 | 0.0 |
|  | Glass | 19.2 | 66.0 | 3.5 | 3.3 | 0.1 | 0.8 | 6.8 | 0.4 |
| Example 8 | Al$_2$O$_3$ | 95.6 | 3.5 | 0.0 | 0.6 | 0.1 | 0.2 | 0.0 | 0.0 |
|  | Al$_2$TiO$_5$ | 41.0 | 2.4 | 0.0 | 53.0 | 0.4 | 0.0 | 3.1 | 0.0 |
|  | Glass | 17.9 | 66.5 | 1.8 | 4.8 | 0.1 | 0.6 | 7.8 | 0.4 |
| Example 10 | Al$_2$O$_3$ | 93.1 | 4.3 | 0.0 | 2.3 | 0.0 | 0.2 | 0.0 | 0.0 |
|  | Al$_2$TiO$_5$ | 45.5 | 2.1 | 0.0 | 50.0 | 0.7 | 0.2 | 1.5 | 0.0 |
|  | Glass | 18.9 | 64.9 | 1.2 | 3.8 | 0.0 | 0.0 | 6.6 | 4.5 |
| Example 13 | Al$_2$O$_3$ | 95.1 | 4.3 | 0.0 | 0.2 | 0.0 | 0.2 | 0.0 | 0.0 |
|  | Al$_2$TiO$_5$ | 43.3 | 2.3 | 0.0 | 51.6 | 0.6 | 0.2 | 2.0 | 0.0 |
|  | Glass | 17.5 | 66.7 | 1.3 | 4.3 | 0.1 | 0.4 | 9.3 | 0.3 |
| Example 14 | Al$_2$O$_3$ | 95.3 | 3.9 | 0.0 | 0.4 | 0.0 | 0.2 | 0.0 | 0.1 |
|  | Al$_2$TiO$_5$ | 42.1 | 2.0 | 0.0 | 53.3 | 0.2 | 0.0 | 2.3 | 0.0 |
|  | Glass | 18.3 | 67.2 | 0.0 | 3.7 | 0.0 | 0.6 | 9.6 | 0.4 |

Examples 2 to 15

In such formulae as shown in Table 2, the procedures of Example 1 were repeated to prepare plugged honeycomb structures. In Example 15, an amount of starch to be added as a pore former was 500 g. A composition of partition walls (a porous body) constituting the plugged honeycomb structure of each of Examples 2 to 15 was qualitatively and quantitatively determined in the same manner as in Example 1. Table 3 shows the composition of the partition walls (the porous body) constituting the plugged honeycomb structure Comparative Example 1

A plugged honeycomb structure was prepared in the same manner as in Example 1 by using (1) of α-Al$_2$O$_3$, TiO$_2$, (1) of talc and mica shown in Table 1. A formula of a forming raw material in Comparative Example 1 included 2550 g of (1) of α-Al$_2$O$_3$, 1950 g of TiO$_2$, 350 g of (1) of talc and 150 g of mica. Amounts of a pore former, a binder and water to be added were the same as in Example 1.

Comparative Example 2

In Comparative Example 2, a forming raw material was prepared by using α-SiC powder having an average particle diameter of 12 μm and α-SiC powder having an average particle diameter of 2 μm. As to amounts of the above powders to be used, the amount of the α-SiC powder having the average particle diameter of 12 μm was 3000 g and the amount of α-SiC powder having the average particle diameter of 2 μm was 2000 g. Furthermore, 300 g of methylcellulose as a binder and an appropriate amount of water were added to the forming raw material. In Comparative Example 2, the procedures of Example 1 were repeated except that the forming raw material was prepared as described above and except that a honeycomb dried body was fired at 2200° C. in an argon atmosphere for two hours, to prepare a plugged honeycomb structure.

Comparative Example 3

In Comparative Example 3, a forming raw material was prepared by using kaolin powder having an average particle diameter of 3 μm, talc powder having an average particle diameter of 24 μm, alumina powder having an average particle diameter of 6 μm and silica powder having an average particle diameter of 21 μm. As to amounts of the above powders to be used, the amount of the kaolin powder was 1110 g, the amount of the talc powder was 2135 g, the amount of the alumina powder was 1210 g, and the amount of the silica powder was 540 g. Amounts of a pore former, a binder and water to be added were the same as in Example 1. The procedures of Example 1 were repeated except that the forming raw material was prepared as described above and except that a honeycomb dried body was fired at 1420° C. for four hours, to prepare a plugged honeycomb structure.

As to partition walls (a porous body) constituting the plugged honeycomb structure of each of Comparative Examples 1 to 3, the same procedures of Example 1 were repeated to measure a true density (g/cm$^3$), a porosity (%), an average pore diameter (μm), a heat capacity (J/K/cm$^3$) and CTE (ppm/K). Table 5 shows the measurement results. In addition, "F" which was a value of "C−0.007×α$^2$" was also calculated. Table 5 shows the value of "F".

TABLE 5

| | True density (g/cm$^3$) | Porosity (%) | Ave. pore dia. (μm) | Heat capacity (J/K/cm$^3$) | CTE (ppm/K) | F |
|---|---|---|---|---|---|---|
| Comparative Example 1 | 3.54 | 45 | 9 | 3.84 | 0.5 | 3.84 |
| Comparative Example 2 | 3.22 | 39 | 9 | 3.76 | 4.5 | 3.62 |
| Comparative Example 3 | 2.52 | 41 | 12 | 3.19 | 0.5 | 3.19 |

(Results)

In a plugged honeycomb structure of Example 1, a heat capacity (J/K/cm$^3$) was larger as compared with plugged honeycomb structures of Comparative Examples 1 to 3. When a mass ratio between α-Al$_2$O$_3$ and Al$_2$TiO$_5$ was changed, a heat capacity (J/K/cm$^3$) changed. Furthermore, each of plugged honeycomb structures of Examples 2 to 4 had a larger heat capacity (J/K/cm$^3$) than the plugged honeycomb structure of Example 1. In Example 5, a mass ratio of α-Al$_2$O$_3$ was smaller than 60 mass %. Therefore, the example had a smaller heat capacity than Example 1. In Example 6, a mass ratio of α-Al$_2$O$_3$ was larger than 90 mass %. Therefore, the example had a larger CTE than Example 4. In a plugged honeycomb structure of each of Examples 7 and 8, a mass ratio of glass was smaller as compared with the plugged honeycomb structure of Example 3. There was confirmed the tendency that when the mass ratio of the glass decreased, a porosity enlarged. When the porosity of the partition walls of the plugged honeycomb structure enlarges, a strength lowers sometimes. In a plugged honeycomb structure of Example 9, a mass ratio of glass was larger as compared with the plugged honeycomb structure of Example 1. The plugged honeycomb structure of Example 9 had a smaller heat capacity (J/K/cm$^3$) than the plugged honeycomb structure of Example 1.

In a plugged honeycomb structure of Example 10, alumina having a comparatively low purity ((2) of α-Al$_2$O$_3$) was used in a forming raw material. In the plugged honeycomb structure of Example 10, a heat capacity (J/K/cm$^3$) was larger as compared with the plugged honeycomb structures of Comparative Examples 1 to 3. In a plugged honeycomb structure of Example 11, an average pore diameter was smaller as compared with the plugged honeycomb structure of Example 1. Also in the plugged honeycomb structure of Example 11, a heat capacity (J/K/cm$^3$) was larger as compared with the plugged honeycomb structures of Comparative Examples 1 to 3. In each of Examples 12 to 15, in a range where partition walls were constituted of a porous body including α-Al$_2$O$_3$ as a main phase and further including aluminum titanate and glass, a composition of the partition walls (the porous body) was changed as shown in Table 3. Also in such plugged honeycomb structures of Examples 12 to 15, a heat capacity (J/K/cm$^3$) was larger as compared with the plugged honeycomb structures of Comparative Examples 1 to 3.

A plugged honeycomb structure of the present invention can be utilized as an exhaust gas purifying filter to purify an exhaust gas.

DESCRIPTION OF REFERENCE SIGNS

1 and 31: partition wall, 2 and 32: cell, 2a and 32a: cell, 2b and 32b: cell, 3 and 33: circumferential wall, 4 and 34: honeycomb structure body, 5 and 35: plugging portion, 6: α-Al$_2$O$_3$, 7: aluminum titanate, 8: glass, 9: pore, 11 and 41: first end face (end face), 12 and 42: second end face (end face), 36: honeycomb segment, 37: bonding layer, 38: outer wall (the outer wall of the honeycomb segment), and 100 and 200: plugged honeycomb structure.

What is claimed is:

1. A plugged honeycomb structure comprising:
    a pillar-shaped honeycomb structure body having porous partition walls defining a plurality of cells which become through channels for a fluid and extend from a first end face to a second end face; and
    plugging portions disposed in open ends of the predetermined cells in the first end face and open ends of the residual cells in the second end face,
    wherein the partition walls are constituted of a porous body including α-Al$_2$O$_3$ as a main phase and further including aluminum titanate and glass.

2. The plugged honeycomb structure according to claim 1, wherein a mass ratio between the α-Al$_2$O$_3$ and the aluminum titanate in the porous body is from 60/40 to 90/10.

3. The plugged honeycomb structure according to claim 2, wherein the porous body includes 5 to 15 mass % of the glass to 100 mass % in total of the $\alpha$-$Al_2O_3$, the aluminum titanate and the glass.

4. The plugged honeycomb structure according to claim 1, wherein in the porous body, at least one selected from a first group consisting of Fe, Mg and Si is solid-dissolved in the aluminum titanate.

5. The plugged honeycomb structure according to claim 4, wherein a mass ratio of each of $Fe_2O_3$, MgO and $SiO_2$ obtained by oxide conversion of Fe, Mg and Si among solid-solution components included into the aluminum titanate is from 0.1 to 10.0 mass % to a total of masses of $Al_2O_3$ and $TiO_2$ obtained by oxide conversion of Al and Ti included in the aluminum titanate and masses of the components included into the aluminum titanate which are obtained by the oxide conversion.

6. The plugged honeycomb structure according to claim 1, wherein the porous body includes 5 to 15 mass % of the glass to 100 mass % in total of the $\alpha$-$Al_2O_3$, the aluminum titanate and the glass.

7. The plugged honeycomb structure according to claim 1, wherein the glass includes $SiO_2$ and $Al_2O_3$.

8. The plugged honeycomb structure according to claim 7, wherein the glass further includes an oxide made of at least one selected from a group consisting of an alkali metal, an alkali earth metal, Ti and Fe.

9. The plugged honeycomb structure according to claim 1, wherein a true density of a material constituting the porous body is from 3.65 to 3.85 g/cm³.

10. The plugged honeycomb structure according to claim 1, wherein a heat capacity of the material constituting the porous body at 600° C. is from 4.25 to 4.50 J/K/cm³.

11. The plugged honeycomb structure according to claim 10, wherein an average thermal expansion coefficient of the porous body at 40 to 800° C. is from 2.5 to 6.0 ppm/K, and wherein the porous body satisfies a relation of the following equation (1):

$$C-0.007\times\alpha^2 \geq 4.20 \qquad (1),$$

in which C is a heat capacity (J/K/cm³) of the material constituting the porous body at 600° C. and $\alpha$ is an average thermal expansion coefficient (ppm/K) of the porous body at 40 to 800° C.

12. The plugged honeycomb structure according to claim 1, wherein an average thermal expansion coefficient of the porous body at 40 to 800° C. is from 2.5 to 6.0 ppm/K.

13. The plugged honeycomb structure according to claim 1, wherein the porous body satisfies a relation of the following equation (1):

$$C-0.007\times\alpha^2 \geq 4.20 \qquad (1),$$

in which C is a heat capacity (J/K/cm³) of the material constituting the porous body at 600° C. and $\alpha$ is an average thermal expansion coefficient (ppm/K) of the porous body at 40 to 800° C.

14. The plugged honeycomb structure according to claim 1, wherein a porosity of the porous body is from 20 to 50%.

15. The plugged honeycomb structure according to claim 1, wherein an average pore diameter of the porous body is from 5 to 20 μm.

16. The plugged honeycomb structure according to claim 1, wherein the honeycomb structure body is a segmented structure which has a plurality of pillar-shaped honeycomb segments having the partition walls and in which the plurality of honeycomb segments are bonded in a state where the honeycomb segments are disposed adjacent to one another so that side surfaces of the honeycomb segments face one another.

17. The plugged honeycomb structure according to claim 1, wherein an exhaust gas purifying catalyst is loaded onto at least one of each surface of the partition walls of the honeycomb structure body and each pore of the partition walls.

* * * * *